(12) United States Patent
Metz et al.

(10) Patent No.: US 8,214,956 B2
(45) Date of Patent: Jul. 10, 2012

(54) DOCK LEVELER BLANKET

(75) Inventors: Donald L. Metz, Kirkville, NY (US);
David Martini, Liverpool, NY (US);
Vincent E. Preuss, Weedsport, NY (US)

(73) Assignee: DL Manufacturing, North Syracuse, NY (US)

( * ) Notice: Subject to any disclaimer, the term of this patent is extended or adjusted under 35 U.S.C. 154(b) by 405 days.

(21) Appl. No.: 12/503,477

(22) Filed: Jul. 15, 2009

(65) Prior Publication Data
US 2011/0010871 A1 Jan. 20, 2011

(51) Int. Cl.
*E04B 1/74* (2006.01)
(52) U.S. Cl. ................. 14/71.3; 52/404.1; 52/506.01
(58) Field of Classification Search ............ 14/71.1, 14/71.3, 71.5; 52/404.1, 506.01, 506.06
See application file for complete search history.

(56) References Cited

U.S. PATENT DOCUMENTS

| | | | | |
|---|---|---|---|---|
| 3,322,132 A | * | 5/1967 | Rieder et al. | 135/123 |
| 3,958,385 A | * | 5/1976 | Bondra et al. | 52/404.1 |
| 4,493,121 A | * | 1/1985 | Williams | 5/505.1 |
| 4,787,107 A | * | 11/1988 | DiMatteo et al. | 5/488 |
| 4,867,677 A | * | 9/1989 | Ulinski | 432/245 |
| 5,692,255 A | * | 12/1997 | Canfield | 5/505.1 |
| 7,140,665 B2 | * | 11/2006 | Mirabella et al. | 296/100.11 |
| 2010/0319143 A1 | * | 12/2010 | Wessel | 14/71.1 |
| 2011/0079674 A1 | * | 4/2011 | Prochnow et al. | 242/390.2 |

* cited by examiner

*Primary Examiner* — Gary S Hartmann
(74) *Attorney, Agent, or Firm* — Harris Beach PLLC (57) ABSTRACT

An insulative blanket is sized and shaped to cover a dock leveler deck and the gaps between the deck and a surrounding dock platform to prevent the transfer of heat through the deck or across the gaps. A batten structure is combined with the blanket such that the combination forms a relatively rigid structure which can be easily placed and maintained in its desired position. The combination is raised and lowered by an attached line and a suspended overhead container is provided to further collapse the combination as it is raised and stored within the container.

27 Claims, 8 Drawing Sheets

DOCK LEVELER BLANKET

TECHNICAL FIELD

This invention relates generally to dock levelers and, more particularly, to a method and apparatus for insulating the top surface and edges thereof.

BACKGROUND OF THE INVENTION

Dock levelers are used to compensate for height differences between a dock platform and the bed of a parked vehicle to permit forklift trucks and personnel to readily move on and off the vehicle during loading and unloading operations. A typical dock leveler is mounted within a pit and has a deck pivotally connected at its rear edge to a frame mounted within the pit for varying the height of the dock leveler in order to compensate for the height differences. An extension plate or lip is typically pivotally connected to the front edge of the deck for spanning the distance between the rear end of the vehicle bed and the outer front end of the deck and permitting forklift trucks and personnel to safely load and unload the truck without difficulty.

To help shield against weather while a vehicle is being serviced at the dock, some type of seal is usually installed around the perimeter of the doorway. Such seals are typically installed along the upper and side edges of the doorway to help seal any air gaps that may otherwise exist between the face of the building and the rear of the vehicle. The dock leveler lip resting upon the rear of the vehicle is often relied upon to seal most of the doorway's lower edge.

The area or pit underneath a dock leveler's deck, however, is usually exposed to outside air. This can create thermal problems (i.e. wet decks, corrosion, heat loss, etc.), particularly when there is a significant temperature differential between the indoor and outdoor air. Warm outside air, for example, may condense underneath a relatively cool deck of a dock leveler used in a cold storage warehouse. The condensation can promote corrosion of various parts of the dock leveler. Conversely, a heated building during the winter may loose a significant amount of heat by thermal conduction through the deck, as cold outside air cools the ramp from underneath. Thus, regardless of whether the outside air is colder or warmer than the inside air, it will generally be beneficial to minimize the transfer of heat through the dock level deck.

The deck is adapted to pivot between downwardly inclined or lowered positions, a horizontal or level position, and upwardly inclined or raised positions relative to the dock platform. When the dock leveler is not in use, the deck is substantially coplanar with the adjacent, upper surface of the dock. To permit such movement of the deck, a gap is typically provided between the adjacent edges of the deck and loading dock surface. Dock levelers typically have a portion of the pit and the associated portions of the dock leveler which extend into the interior of the building. Thus, even when the access door between the loading dock and the building interior is closed, convection and/or wind currents will cause the flow of air from the outside to pass through the gaps and into the interior of the warehouse. That is, in the cold seasons, cold air will tend to flow up through the gap and in the warmer seasons hot air will tend to flow through the gaps and into the warehouse.

In order to reduce the flow of outside air through the gap, pliable ceiling material may be provided between the two. One approach is that of providing a generally horizontally extending brush structure which may be attached to either the dock leveler of the side of the dock platform so as to extend across the gap and thereby reduce the amount of air that flows therein. However, unless both the dock leveler and the pit are perfectly square, the brush structure will not provide a complete seal and leakage will occur. Further, there are certain areas, such as the corners, in which it is difficult to install such a brush structure.

One approach to the heat transfer problem is that shown in copending application Ser. No. 12/177,514 filed Jul. 22, 2008 and assigned to the assignee of the present invention, wherein a sheet of insulative material is secured to the lower surface of the dock leveler platform so as to thereby reduce the heat transfer through the platform. However, such an approach does not address the problem of airflow through the gaps between the dock leveler and dock platform.

Another approach is that of temporarily placing an insulative blanket over the dock leveler such that it covers not only the dock leveler deck but also the surrounding gaps. While this approach is effective in insulating the dock leveler deck and reducing or preventing the flow of air through the gap, it is impractical in the sense that placement in the operative position is difficult and storage, when not in use, is a problem. That is, if the cover is rigid it is likely to be heavy and difficult to move into a desired position, and if it is light and flexible it tends to bunch up and not properly spread to the desired position. Further, when either of the these types of covers are removed from their covering position, they tend to be thrown to one side where they will be in the way of an operator.

What is needed is a method and apparatus for installing, removing, and storing an insulative cover for a dock leveler.

DISCLOSURE OF THE INVENTION

In accordance with one aspect of the invention, a blanket with an included batten structure for providing rigidity, is temporarily placed over a dock leveler deck and the surrounding gaps so as to thereby insulate the deck and prevent the flow of air through the gaps.

In accordance with another aspect of the invention, provision is made to remove the blanket/batten combination by way a retracting line attached thereto for raising the combination above the deck.

By yet another aspect of the invention, a storage box is provided above the combination, and the batten structure is collapsible such that the blanket/batten combination can be temporarily collapsed and stored within the box when use of the deck is desired.

In the drawings as hereinafter described, preferred and modified embodiments are depicted; however, various other modifications and alternate constructions can be made thereto without departing from the scope of the disclosure.

DETAILED DESCRIPTION OF THE INVENTION

Figure 1:
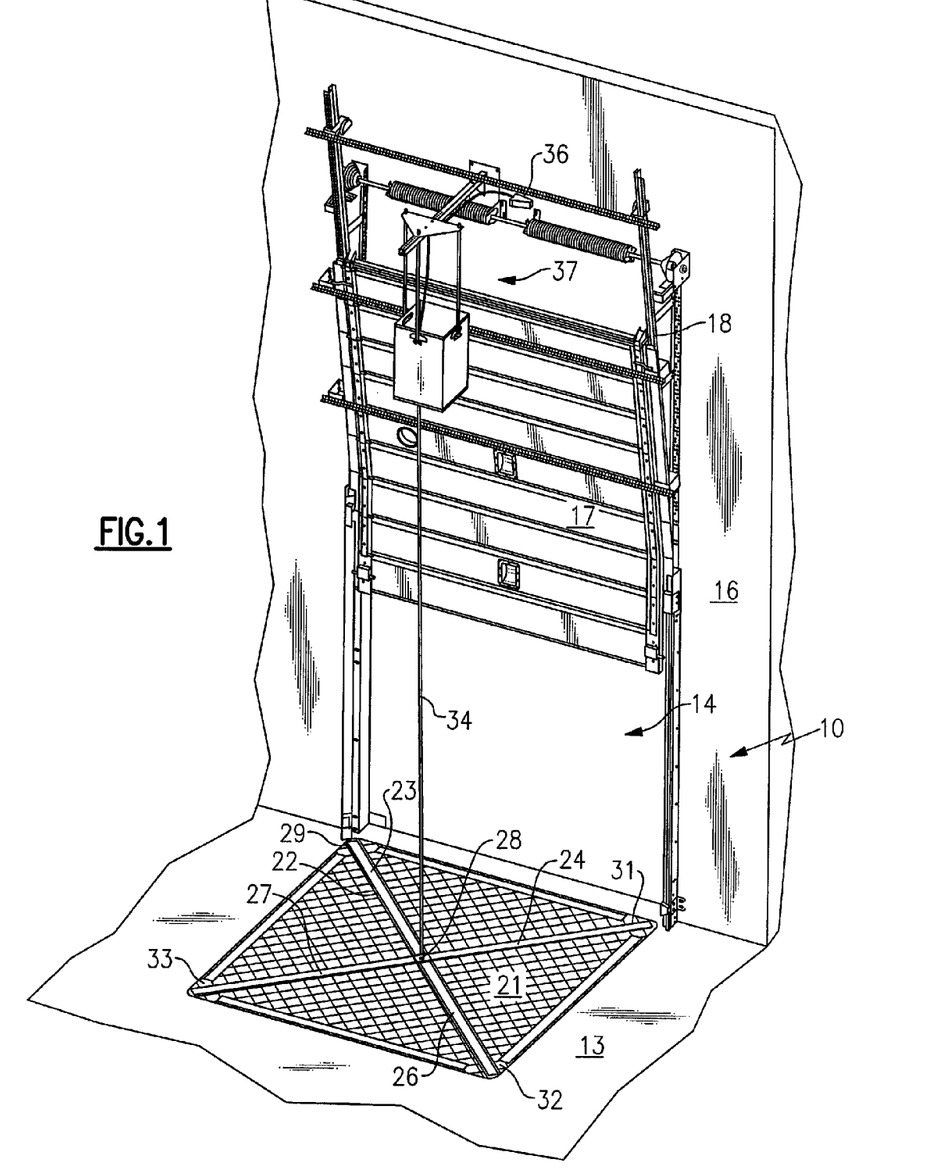
FIG. 1 is a perspective view of the present invention as applied to a dock leveler of a loading dock.
Figure 2:
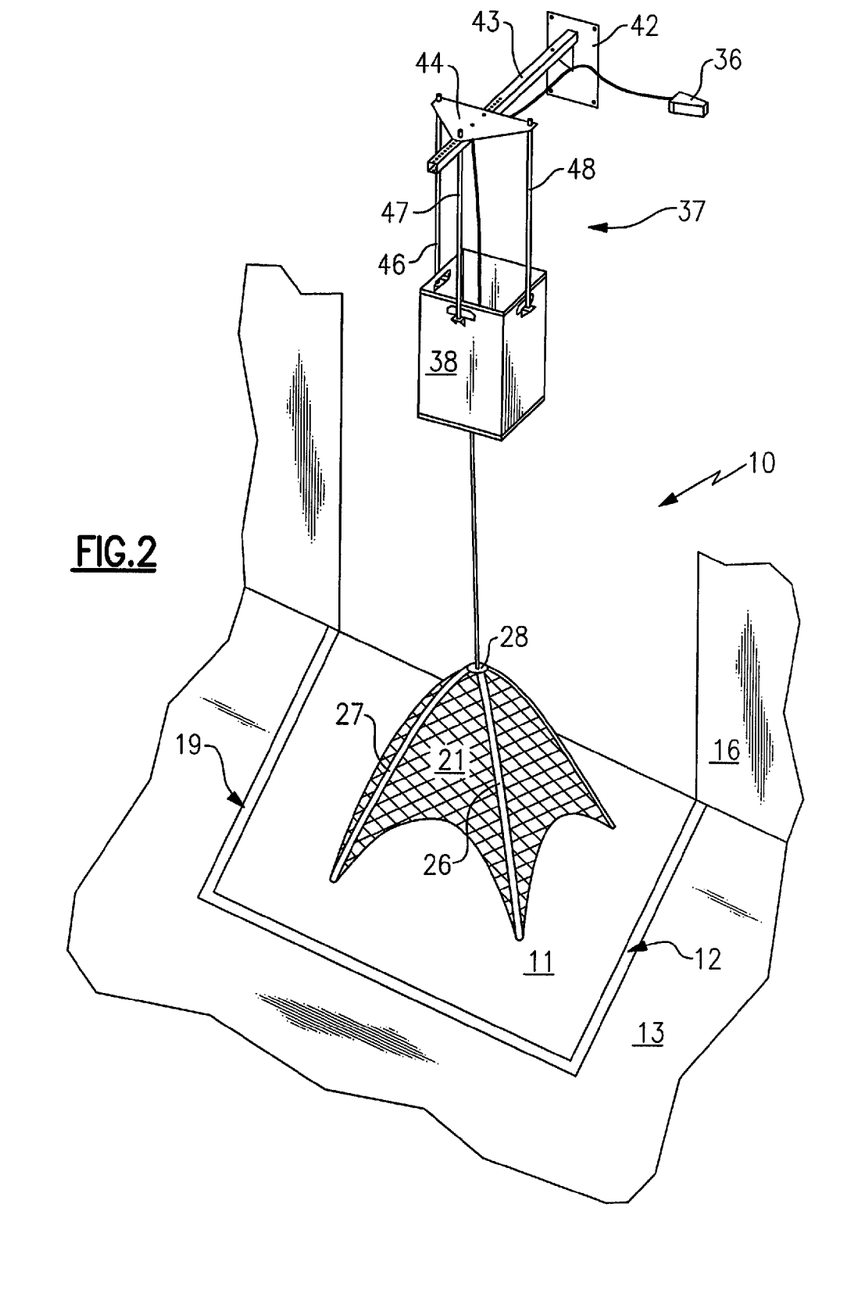
FIG. 2 shows the blanket/batten combination in its partially retracted position in accordance with the present invention.

The invention is shown generally at 10 in FIGS. 1 and 2 as applied to a dock leveler deck 11 which is adapted to be selectively moveable vertically within a pit 12 of a dock platform 13. The pit 12 and the dock leveler deck 11 is adjacent an opening 14 in a building side wall 16. The opening 14 has an overhead door 17 that can be selectively raised and/or lowered within tracks 17 so as to provide access to the dock leveler deck 11 from a truck backed up to the opening 14.

As shown in FIG. 2, in order to facilitate vertical movement of the dock leveler deck 11 within the pit 12, it is necessary to have gaps 19 on the three interior sides thereof. When the door 17 is closed and the dock leveler is not in use, the pit 12 is exposed to outdoor air, and the outdoor air tends to flow up through the gaps 19 and into the building to thereby undesirably cause a heat transfer into or out of the building. The present invention is made to address this problem.

As shown in FIG. 1, an insulative blanket 21 is provided, with sufficient dimensions to cover both the dock leveler deck 11 and the gaps 19 so as to thereby insulate the dock leveler deck 11 to substantially reduce the transfer of heat between the deck and the air above, and also prevent or reduce the flow of air into the building by way of the gaps 19. The blanket 21 can be made of any suitable material but is preferably made of a lightweight and flexible material such as a quilted material or the like. In this regard, it is desirable to provide a blanket that is easy to move around and easy to store when not in use. Because such a lightweight flexible material is difficult to precisely place in a desired position, the applicants have found that it is highly desirable to also include a structure that provides rigidity to the blanket 21. That is, without such rigidity, it is necessary for an operator to first spread out the blanket 21 so that it lies flatly on the dock leveler deck 11. It is then necessary to slide the blanket 21 such that it covers each of the gaps 19. This is difficult to do from any one position, and usually requires the operator to move between sides of the blanket 21 so as to pull the blanket into the desired position.

In order to provide the desired rigidity, the applicants have provided a batten structure 22 comprising battens 23, 24, 26 and 27 installed in a diagonal relationship as shown, such that when the blanket 21 is lying on the top surface of the dock leveler deck 11, it is caused to assume a rectangular form, which is sufficiently rigid to allow an operator to easily slide into the precise desired position. The battens can be made of any semi-rigid but flexible material such as plastic or the like.

In order to position and secure the battens 23-27 in place, a center receptor 28 and 4 corner receptors 29, 31, 32 and 33 are provided. The center receptor 28 may take on any of various forms that will provide the desired function. As shown, the center receptor 28 is four-sided with each side having a slot into which a batten can be inserted. The corner receptors 29, 31, 32 and 33 may also be of any of a variety of forms such as a simple strap that cuts across the corner to form a pocket. The lengths of the battens 23, 24, 26 and 27 are equal and sufficient that, when aligned end to end, a pair of battens, e.g. battens 24 and 27 have a combined length equal to the diagonal distance between the corners corresponding to the corner receptors 31 and 33. In this way, not only is the blanket 21 maintained in a substantially rectangular form, but also the edges are held in a taut condition such that a flow of air coming up through the gap 19 will not tend to raise up the edge of the blanket 21 from its covering position.

As will be seen in FIG. 1, the blanket 21 is in its installed position for covering the dock leveler deck 11 during periods in which it is not in use. When the door 17 is opened for the purpose of loading or unloading at the dock, it is necessary to remove the blanket from its installed position, to move it out of the vicinity so as to facilitate the proper use of the dock leveler, and to temporarily store the blanket and batten combination. This is accomplished by way of a line 34 which is attached at its one end to the center receptor 28 as shown. The line 34 extends upwardly through one or more pulleys (not shown) and eventually to a retracting mechanism 36 which is adapted to selectively wind up the line 34 while raising the blanket/batten combination as shown in FIG. 2. As will be seen, when the center receptor 28 is lifted, the individual battens 23-27, along with the blanket 21, tends to sag in much the same way as an umbrella which is being contracted. The blanket/batten combination can be raised to a sufficient height to where it is out of the way, and so as to be not contained in any way. However, a storage structure shown generally at 37 may be provided to hold the blanket/batten combination in a fixed, collapsed position, while also temporarily storing the combination in a remote location.

Figure 4:
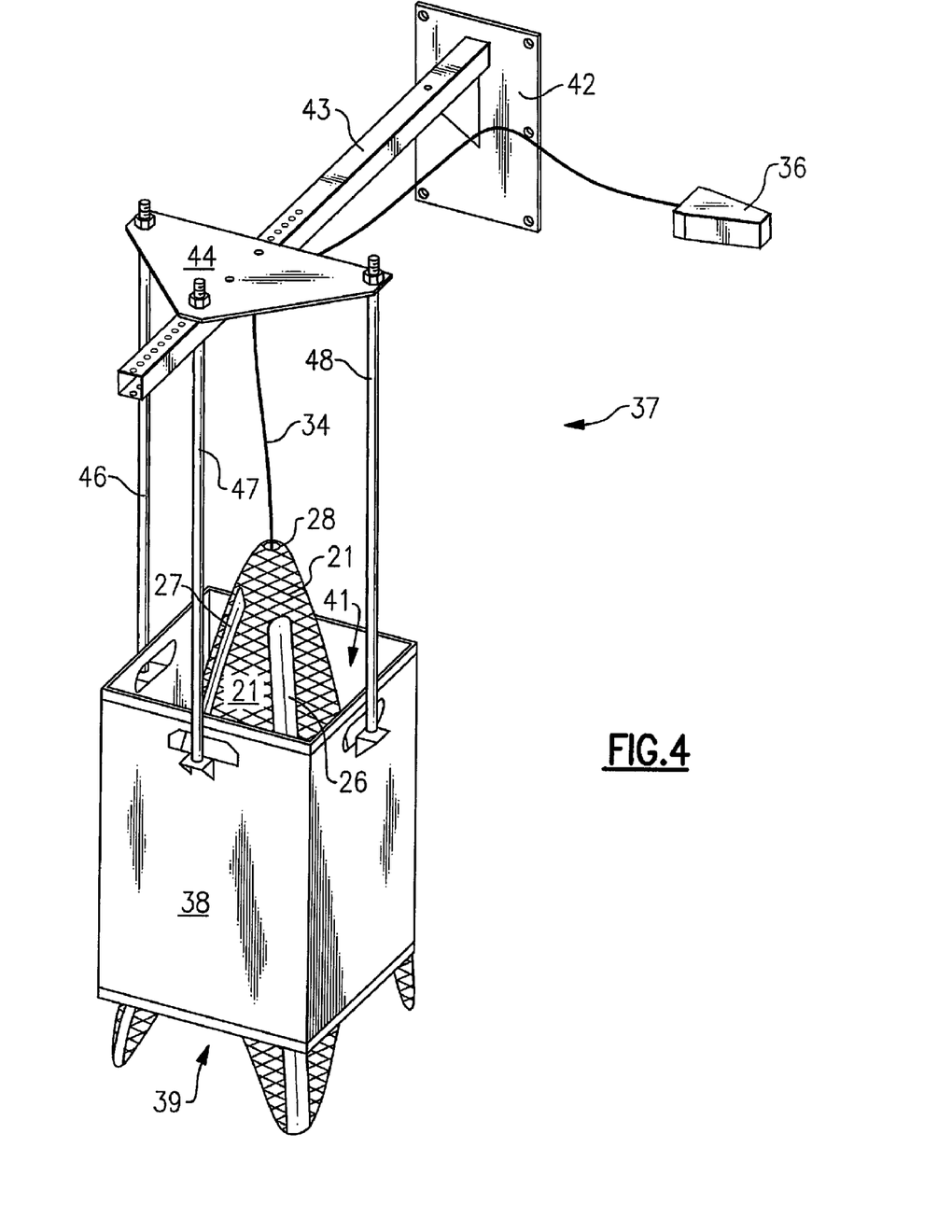
FIG. 4 is an enlarged view of a portion thereof.

The storage structure 37 is best seen in FIG. 4 and includes a boxlike structure 38 with open ends 39 and 41, and supporting structure for suspending the box-like structure or storage box 38 in its elevated position above the dock leveler deck 11. For that purpose, a support plate 42 is secured to the building side wall 16 and has a support beam 43 cantilevered therefrom. A positioning plate 44 is secured to the top surface of the support beam 43 as shown, and three support rods 46, 47 and 48 supportable interconnect the corners of the positioning plate 44 with three sides of the storage box 38. Although the positioning plate 44, and consequently the storage box 38, is shown as being located substantially over the center of the dock leveler deck, i.e. directly over the center receptor 28 when the blanket/batten combination is in the installed position, it may be positioned in other locations if necessary to accommodate a particular type of installation.

Figure 3:
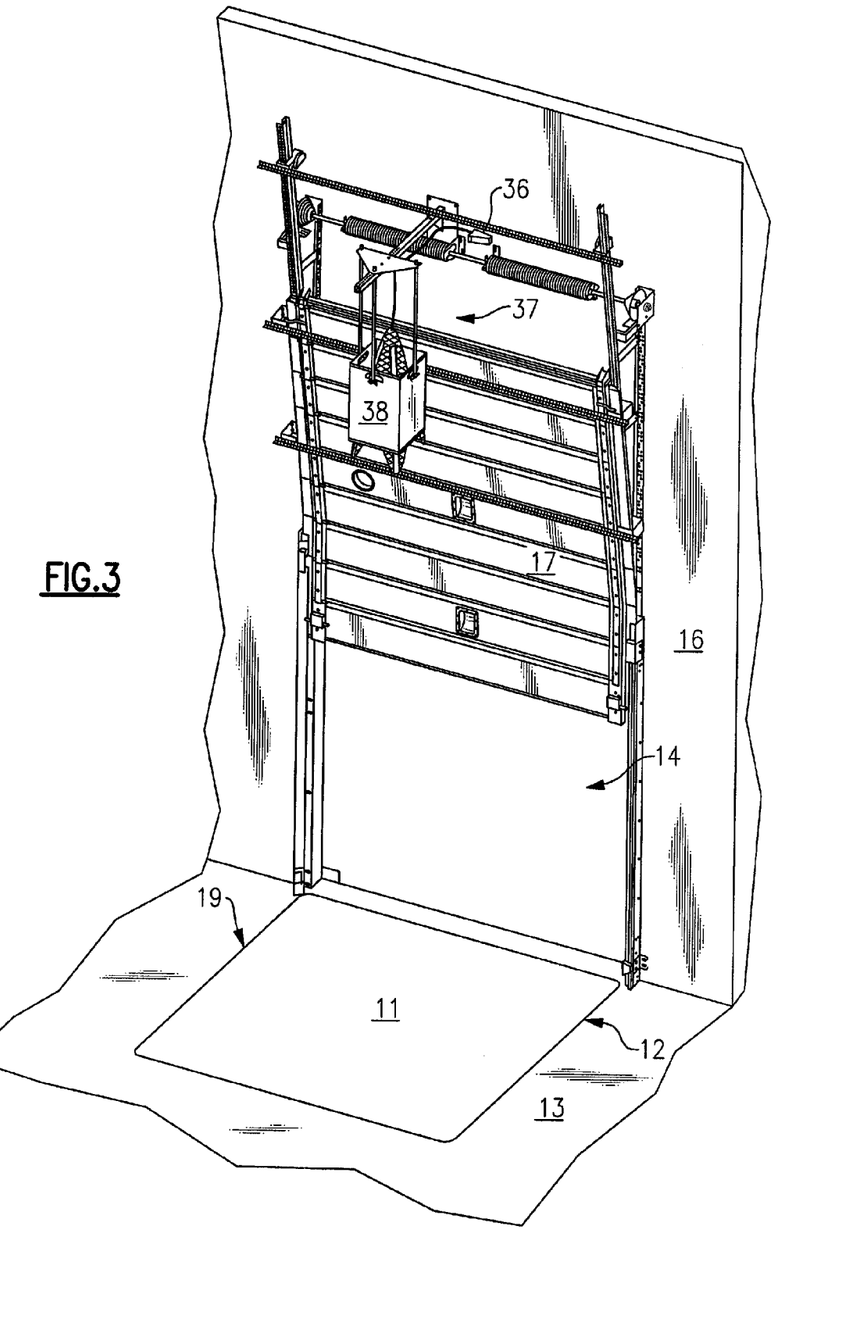
FIG. 3 shows the combination in the fully retracted position in accordance with the present invention.

As shown in FIGS. 3 and 4, when the blanket/batten combination is raised to allow use of the dock leveler, it collapses to a first position as shown in FIG. 2, and when it is further raised to the point where it begins to enter the storage box 38 as shown in FIGS. 3 and 4, it then further collapses to its temporarily stored position within the storage box 38 as shown. It will be seen that the individual battens 23-27 tend to enter the respective corners of the storage box 38 and remain in those positions. This increases the likelihood that, when the blanket/batten combination is later lowered to again cover the dock leveler deck 11, the combination will be in the desired position and orientation to properly cover the dock leveler deck 11 and the surrounding gaps.

Figure 5:
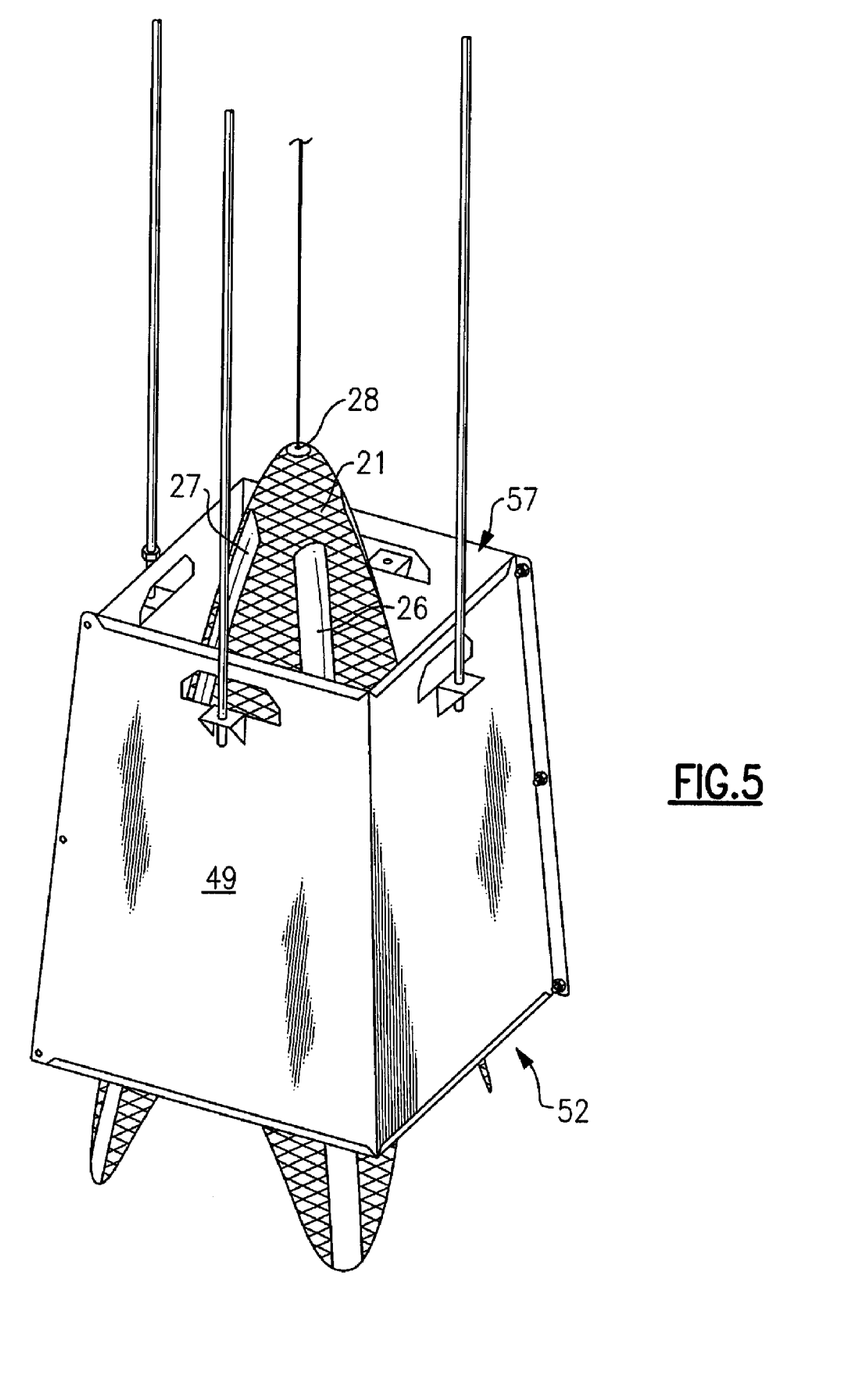
FIG. 5 is a perspective view of an alternative embodiment of the storage box portion thereof.

Referring now to FIG. 5, an alterative embodiment of a storage box is shown at 49 wherein the widths of the four sides are tapered such that the top opening 51 is smaller than the bottom opening 52. Again, the battens 23-27 are generally orientated to fit at the corners as in the FIG. 4 embodiment. However, in this embodiment, the tapered form of the storage box 49 tends to better receive the ascending blanket since its shape, when collapsed, is also tapered in form with the bottom thereof being larger than the top thereof. The tapered form therefore allows easier movement into the storage box 49 as well as the removal thereof when the storage box is lowered.

Figure 6:
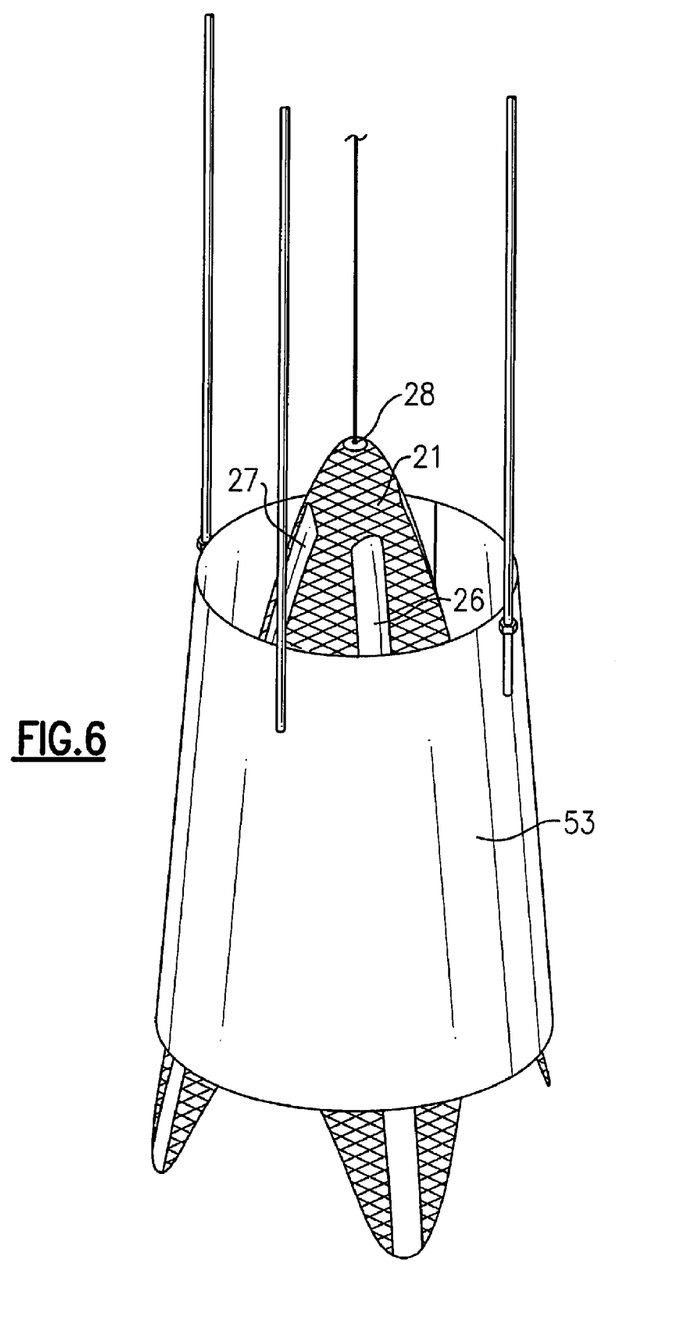
FIG. 6 is a perspective view of another alternative embodiment of the storage box portion of the invention.

A further alterative embodiment of the storage box is shown at 53 in FIG. 6. Here the storage box 53 is round in cross section and longitudinally tapered with a larger opening in the bottom and smaller opening at the top thereof. In this configuration, the battens 23-27 are able to fit into any circumferential position and, again, the tapered configuration allows easier insertion and withdrawal.

It should be understood that the invention as described hereinabove is designed for use with vertical and tilt door arrangements wherein sufficient vertical clearance above the door is provided for installation of the blanket storage apparatus as described. Another alternative, and simpler, approach is shown in FIGS. 7 and 8 wherein a storage container is not provided but rather, the blanket 21 is simply raised above the door in an open and uncontained condition.

Figure 7:
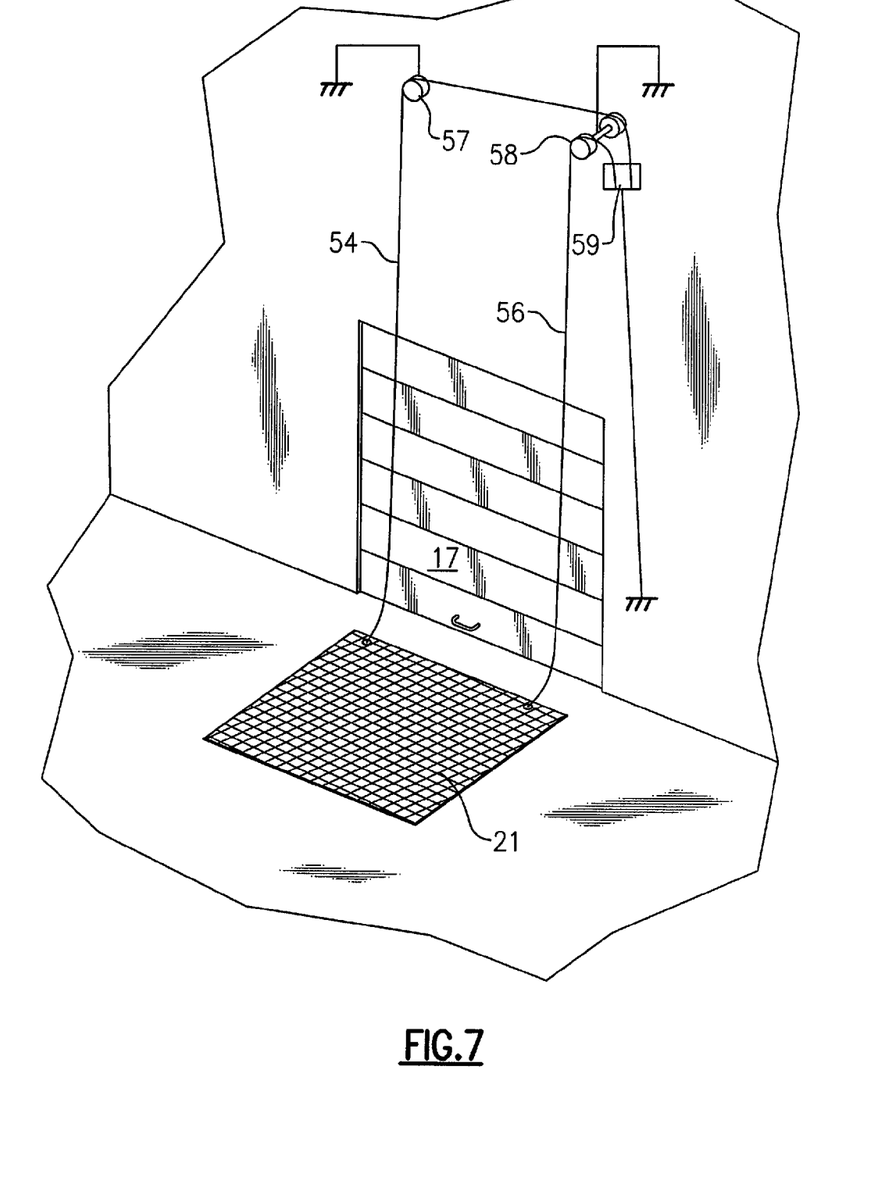
FIGS. 7 and 8 are perspective views of yet another alternative embodiment of the invention.

In FIG. 7, the blanket is shown in the installed i.e. insulating, position with the door 17 closed. A pair of lines 54 and 56 are attached to the corners on the opposite sides of the blanket 21 as shown. Above the door 17 are mounted to the wall, a pair of pulleys 57 and 58, the pulley 57 being a single pulley arrangement and the pulley 58 being a double-pulley arrangement as shown. Line 54 extends upwardly and over the pulley 57 and then horizontally over to one of the pulleys in the double pulley arrangement 58. The other line 56 extends upwardly and over the other pulley in the double pulley arrangement 58 and then downwardly. In one arrangement, both lines 54 and 56 may extend downwardly to the operator and be simultaneously pulled in order to raise the blanket 21 above the door 17 as shown in FIG. 8. Alternatively, a connector 59 may be applied to interconnect the two lines such that an operator may raise the blanket by pulling a single downwardly extending line as shown in FIG. 7.

Figure 8:
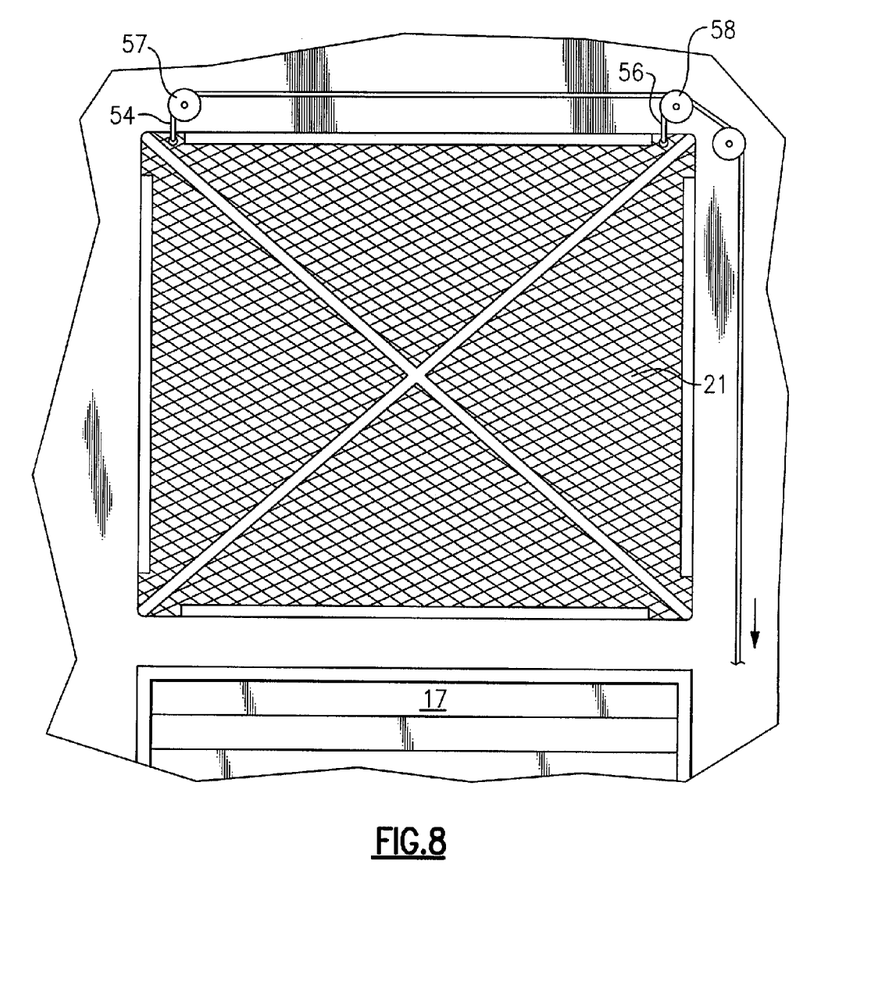

As shown in FIG. 8, the blanket 21 is held in an elevated position above the door 17 during periods in which the door is open and behind the blanket 21, and when the door is closed, the blanket 21 can again be placed in the useable position as shown in FIG. 7.

While the present invention has been particularly shown and described with reference to the preferred mode as illustrated in the drawings, it will be understood by one skilled in the art that various changes in detail may be effected therein without departing from the spirit and scope of the invention as defined by the claims.

We claim:

1. An apparatus for covering a dock leveler deck and the gaps between the deck and a surrounding dock platform, comprising:
   an insulative blanket for temporary placement over the deck and gaps;
   at least one batten combined with said blanket and extending thereacross for providing stiffness to the combination and thereby aiding in the placement thereof;
   at least one retracting line attached to said combination for selectively raising it to an elevated position to facilitate use of the deck.

2. An apparatus as set forth in claim 1 wherein said at least one batten includes a pair of battens that are substantially orthogonal to each other.

3. An apparatus as set forth in claim 2 wherein said at least one batten comprises four battens with each batten extending from a rectangular corner to a central location of said blanket.

4. An apparatus as set forth in claim 1 wherein said at least one batten is comprised of a plastic material.

5. An apparatus as set forth in claim 1 wherein said at least one retracting line is attached to a central position on said blanket/batten combination.

6. An apparatus as set forth in claim 1 and including a storage container supported in a suspended position and adapted to receive the blanket/batten combination for storage when in the raised position.

7. An apparatus as set forth in claim 6 wherein said storage container is disposed in a central position above said dock leveler deck.

8. An apparatus as set forth in claim 6 wherein said storage container is so sized and constructed as to cause the blanket/batten combination to further collapse as it enters the container.

9. An apparatus as set forth in claim 7 wherein said container is generally rectangular in shape with open top and bottom ends.

10. An apparatus as set forth in claim 8 wherein said container is generally round in shape with an open top and bottom.

11. An apparatus as set forth in claim 8 wherein said container is longitudinally tapered to be smaller at a top end and larger at a bottom end.

12. An apparatus as set forth in claim 1 wherein said at least one retracting line comprises a pair of lines attached to said combination, said lines each extending upwardly and over respective pulleys such that when said lines are drawn downwardly, said combination is raised to an elevated position.

13. An apparatus as set forth in claim 12 wherein said lines are attached on opposite sides of said blanket.

14. An apparatus as set forth in claim 12 wherein one of said pulleys is a double pulley.

15. A method of temporarily covering a dock leveler deck and the gaps between the surrounding dock platform comprising the steps of:
   providing an insulative blanket for temporary placement over the deck and gap;
   providing at least one batten in combination with said blanket and extending there across for providing stiffness to the combination and thereby aiding the placement thereof;
   providing at least one retracting line attached to said combination for selectively raising it to an elevated position to facilitate use of a deck.

16. A method as set forth in claim 15 wherein said at least one batten includes a pair of battens that are substantially orthogonal to each other.

17. A method as set forth in claim 16 wherein said at least one batten comprises four battens that extend from the rectangular corner to a central location of said blanket.

18. A method as set forth in claim 15 wherein said at least one batten is comprised of a plastic material.

19. A method as set forth in claim 15 wherein said at least one retracting line is attached to a central position on said blanket/batten combination.

20. A method as set forth in claim 15 and including the step of providing a storage container supported in a suspended position over said dock leveler deck and adapted to receive the blanket/batten combination for storage when in the raised position.

21. A method as set forth in claim 20 wherein said storage container is so sized and constructed as to cause the blanket/batten combination to further collapse as it enters the container.

22. A method as set forth in claim 21 wherein said container is generally rectangular in shape with open top and bottom ends.

23. A method as set forth in claim 21 wherein said container is generally round in shape with an open top and bottom.

24. A method as set forth in claim 21 wherein said container is longitudinally tapered to be smaller at a tip end and larger at a bottom end.

25. A method as set forth in claim 15 wherein said at least one retracting line comprises a pair of lines attached to said combination, and including the step of extending each of said lines upwardly and over respective pulleys such that when said lines are drawn downwardly, said combination is raised to an elevated position.

26. A method as set forth in claim 25 and including the step of attaching said lines on opposite sides of said blanket.

27. A method as set forth in claim 25 wherein one of said pulleys is a double pulley.

* * * * *